Nov. 1, 1966  J. A. SCHARSU  3,282,482
HARNESS FOR HOLDING A FISHING ROD OR THE LIKE
Filed June 1, 1965
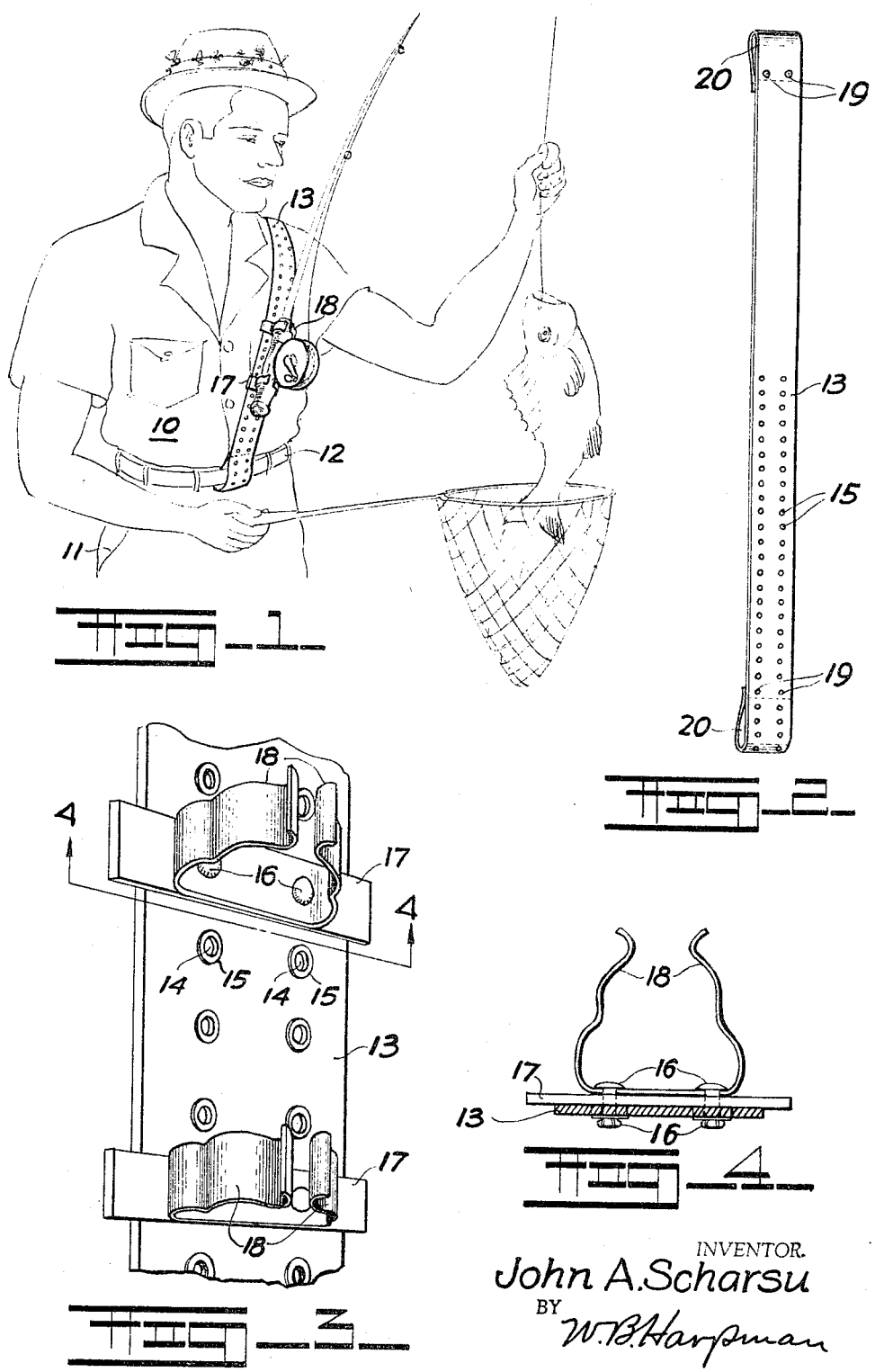
INVENTOR.
John A. Scharsu
BY
W. B. Harpman
ATTORNEY.

United States Patent Office 3,282,482
Patented Nov. 1, 1966

3,282,482
HARNESS FOR HOLDING A FISHING ROD OR THE LIKE
John A. Scharsu, 1551 Price Road, Youngstown, Ohio
Filed June 1, 1965, Ser. No. 460,032
4 Claims. (Cl. 224—7)

This invention relates to a harness taking the form of a pair of belts arranged to be worn by a fisherman to provide means for temporarily holding a fishing rod or the like.

The principal object of the invention is the provision of a harness for holding a fishing rod that may be quickly and easily positioned on the person of the fisherman to provide a convenient, easily accessible device for temporarily holding a fishing rod.

A further object of the invention is the provision of a harness for holding a fishing rod which is inexpensively formed of belting or the like and part of which harness may comprise the conventional belt used on the fisherman's trousers.

A still further object of the invention is the provision of a harness for holding a fishing rod which provides adjustable clamping means for engaging the fishing rod so that the clamping means may be varied relative to one another and relative to the harness as desired.

The harness for holding a fishing rod or the like as disclosed herein comprises a simple and inexpensive device which may be readily worn by a fisherman and which device will temporarily hold a fishing pole as, for example, when both of the fisherman's hands are used for baiting the hook, or attaching a different fly, or removing a fish that has been caught.

Fishermen will recognize that heretofore it has been necessary for a fisherman who was wading in a creek or a lake to walk to shore to lay down the fishing pole while the bait, hook or fish were handled. With the present invention, the fisherman merely places the pole temporarily in the harness, which is positioned on his body, and the pole is held firmly and in an appropriate position freeing his hands as desired.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a view of the harness for holding a fishing pole positioned on a fisherman and holding a fishing rod and reel.

FIGURE 2 is a plan view of the elongated strap portion of the device.

FIGURE 3 is an enlarged section of the harness showing the clamping means in which the fishing pole is engaged, and the means for adjustably mounting the same on the strap.

FIGURE 4 is a cross section on lines 4—4 of FIGURE 3.

By referring to the drawings and FIGURE 1 in particular, it will be seen that a fisherman is shown wearing a shirt 10 and trousers 11 positioned over one shoulder and with the ends of the strap 13 looped back upon themselves and forming openings through which the belt 12 is positioned. The belt 12 is therefore a necessary part of the harness as disclosed herein. The strap 13 has a plurality of longitudinally spaced openings 14 defined by eyelets 15 and arranged in pairs. The eyelets 15 are adapted to receive and retain resilient pins 16 as best illustrated in FIGURES 3 and 4 of the drawings, and which pins 16 are positioned on body members 17 so as to secure modified U-shaped clamps thereto, the clamps comprising spaced, oppositely disposed spring arms 18.

By referring now to FIGURE 2 of the drawings, it will be seen that the strap 13 is an elongated section of suitable material having the opposite ends thereof provided with pins 19 and matching eyelets 15 so that the ends of the strap 13 can be doubled back to form loops 20 through which the belt 12 of the fisherman may be positioned.

It will be observed that the eyelets 15 extend longitudinally of the strap 13 approximately half its length and which corresponds with the portion of the strap 13 which appears on the front of the fisherman as seen in FIGURE 1 of the drawings.

It will be obvious to those skilled in the art that if desired the belt 12 can be attached to the ends of the strap 13 and thereby become a component of the harness as it is used. In either event, it will be observed that the relative position of the belt 12 with respect to the shoulder of the fisherman requires an adjustment lengthwise of the strap 13 and that this is accomplished by the ability of the strap 13 to be adjusted as to overall length when its outermost ends carrying the resilient pins 16 is secured to the eyelets 15 as hereinbefore described.

It will be seen by referring to FIGURE 1 of the drawings that the harness when properly installed is held in semi-vertical position across the shirt front of the fisherman by the belt 12 which is positioned around his waist as customary. It will also be seen that the opposed clamping arms 18 are positioned vertically with respect to one another, and that they may be conveniently so positioned so that they will receive and hold a handle of a fishing rod, fly rod or the like, and it will be observed that when the fisherman desires to free his hands so as to change the bait or the fly being used, or to remove a fish that has been caught be can quickly and easily position the fishing rod in the clamps 18 where it will be held thus freeing both hands.

It will thus be seen that a harness for holding a fishing rod or the like has been disclosed that is particularly suitable for use by a fisherman in temporarily holding all types of fishing rods, spinning, spin cast, fly and casting rods and the like, and having thus described my invention,
What I claim is:

1. A harness for holding a fishing rod or the like and comprising a waist encircling belt and a strap having its opposite ends adjustably secured to said belt and arranged to be positioned over the shoulder of a person, a plurality of eyelets spaced longitudinally of said belt and comprising components of snap fasteners and a pair of body members each of which has clamping arms extending outwardly therefrom provided with resilient pins engageable with said eyelets and forming components of snap fasteners.

2. The harness for holding a fishing rod set forth in claim 1 and wherein the eyelets are positioned in said strap in longitudinally spaced pairs and the projecting pins on said body members holding said clamps are arranged in spaced pairs for registry with any of said pairs of eyelets.

3. The harness for holding a fishing rod set forth in claim 1 and wherein the clamps comprise resilient metal arms, the outer ends of which are spaced closer to one another than the inner portions thereof and arranged to clampingly receive a fishing rod therebetween.

4. The harness for holding a fishing rod set forth in claim 1 and wherein the strap having said longitudinally spaced eyelets therein is adjustable as to length.

(References on following page)

References Cited by the Examiner

UNITED STATES PATENTS

| | | | |
|---|---|---|---|
| 559,053 | 4/1896 | Bolt | 224—5.1 |
| 1,657,263 | 1/1928 | Lauby | 224—5.1 |
| 1,827,524 | 10/1931 | Hilburger. | |
| 2,643,803 | 6/1953 | Bate | 224—5 |
| 2,973,125 | 2/1961 | Parry | 224—5 |
| 3,129,863 | 4/1964 | Haugen et al. | 224—5 |

References Cited by the Applicant

UNITED STATES PATENTS

| | | |
|---|---|---|
| 2,658,650 | 11/1953 | Jasper. |
| 2,670,111 | 2/1954 | Stahle. |
| 2,709,544 | 5/1955 | Barringer. |
| 2,742,210 | 4/1956 | Bortz et al. |

GERALD M. FORLENZA, *Primary Examiner.*

F. WERNER, *Assistant Examiner.*